United States Patent [19]

Brauner et al.

[11] 4,134,954
[45] * Jan. 16, 1979

[54] SPINNING PROCESS AND DEVICE WITH STATIC MIXING INSERTS

[75] Inventors: Dieter Brauner, Solingen-Wald; Hans J. Kaluza, Cologne; Edgar Muschelknautz, Leverkusen, all of Germany

[73] Assignee: Bayer Aktiengesellschaft, Leverkusen, Germany

[*] Notice: The portion of the term of this patent subsequent to Jul. 6, 1994, has been disclaimed.

[21] Appl. No.: 873,035

[22] Filed: Jan. 27, 1978

Related U.S. Application Data

[63] Continuation of Ser. No. 702,305, Jul. 2, 1976, abandoned.

[30] Foreign Application Priority Data

Jul. 19, 1975 [DE] Fed. Rep. of Germany ....... 2532346

[51] Int. Cl.² ............................................. D01D 1/06
[52] U.S. Cl. ............................. 264/176 F; 425/198; 425/DIG. 49
[58] Field of Search ..................... 425/198, 199, 382.2, 425/DIG. 49; 210/285, 286; 366/336–340; 264/176 F

[56] References Cited

U.S. PATENT DOCUMENTS

| | | | |
|---|---|---|---|
| 3,620,506 | 11/1971 | Stephen | 366/337 |
| 3,923,288 | 2/1975 | King | 366/336 |
| 4,061,313 | 12/1977 | Brauner et al. | 366/340 |

FOREIGN PATENT DOCUMENTS

| | | | |
|---|---|---|---|
| 2250837 | 5/1974 | Fed. Rep. of Germany | 164/412 |
| 346468 | 4/1931 | United Kingdom | 210/285 |

Primary Examiner—Robert D. Baldwin
Attorney, Agent, or Firm—Sprung, Felfe, Horn, Lynch & Kramer

[57] ABSTRACT

For the homogenization of the spinning fluid in spinning devices, packing material is arranged before the nozzle plate in the free spaces of a static mixing apparatus.

4 Claims, 4 Drawing Figures

SPINNING PROCESS AND DEVICE WITH STATIC MIXING INSERTS

This is a continuation, of application Ser. No. 702,305, filed July 2, 1976, now abandoned.

The present invention relates to a spinning device consisting of a spinning nozzle with conduits for a spinning fluid, in which the conduits lead to a housing, in which a packing material is provided before a nozzle plate.

Packing material before nozzle plates in spinning devices have the purpose of restricting the residence time spectrum by distributing the spinning fluid uniformly by means of the packing material and avoiding having corners untouched by the flow.

Whereas by the use of packing material it is possible to obtain a local fine distribution, of the spinning fluid, a coarse distribution, in which an exchange takes place over broader sections of the cross-section, cannot be achieved by means of a packing material. If it is desired to improve the effect, a column of packing material must be used whose height is at least ten times its diameter.

Sintered metal candles are also known, whose homogenising effect also is only effective in a limited part volume.

The object of the present invention therefore is to provide a spinning device, which is a short homogenising section achieves a high degree of homogenisation.

According to the invention, there is provided a spinning device, comprising a spinning pump with conduits for a spinning fluid, said conduits opening into a housing having a static mixing apparatus arranged therein, free spaces in the static mixing apparatus being filled with packing material and a nozzle plate arranged at the downstream end of the housing.

The effect of this is that in addition to the locally limited fine distribution by the packing material, a desired coarse distribution is achieved by means of the fittings of the static mixing apparatus. It has surprisingly proved, that even for coarse mixing only very small mixing sections are necessary, so that the spinning device formed according to the invention is also ideal in respect of maintaining temperature by virtue of its compact construction.

Preferably the static mixing apparatus should be provided with mixing inserts comprising intersecting planes provided with cross pieces and slots, which are arranged diagonally with respect to the inner wall of the housing. In this arrangement, a plurality of pairs of parallel planes can be arranged, so that in each case a plurality of planes penetrate with their cross pieces through the slots of one or more intersecting planes.

In this way a compact short construction of the mixing section is achieved.

It is self-evident that the grain size of the packing material may not be smaller than the size of the nozzle apertures. The packing materials should be formed in such a way that they cannot clog the nozzles. If the packing material is smaller than the nozzle apertures, which would not be the case, or if they have a shape which might make the clogging of the nozzles possible, then a sieve grille should be arranged before the nozzle plate, whose mesh width is smaller than the grain size of the packing material. If the packing material is larger than the width of the slots of the intersecting planes, then the planes of the mixing inserts nearest the nozzle plate can serve as a limit for the packing material.

Suitable packing materials are all those which are used in packed columns. Of course the size of the packing material is dependent on the free cross-section of the housing and on the type of substances to be mixed. If reactions are to take place, the packing material can optionally be produced from a material acting as a catalyst. However, normally, the material of the packing material should not influence the reaction. For smaller housing diameters the following are in particular suitable: sand, glass beads or granulate of corresponding grain size; for larger housing diameters, insofar as permitted by the remaining free space between or in the region of the mixing tools, those which are described in Ullmann's Enzyklopadie der technischen Chemie, 3. Auflage, 1. Band "Chemischer Apparatebau and Verfahrenstechnik", Urban & Schwarzenberg, Munchen Berlin, 1951, on page 441 in illustration 683. Reference is made there to inclined film blades, Stedman bodies, Berl saddles, Raschig rings, ceramic rings with fittings, Haltmeier rolls, twin bodies, Intos rings, rings of glass or wire mesh, Wilson spirals, Brunswick coils and Prym rings.

The flow and mixing effect through the mixing section can be influenced very simply by filling the chambers formed by the intersecting planes with packing materials of varying size and/or type according to the desired effects. Effects can also be obtained by varying degrees of filling of the individual chambers.

According to a particular embodiment, several parallel static mixing devices are arranged over the nozzle plate in the housing, so that in order to obtain good thorough mixing a more favourable ratio of mixer length to diameter is achieved than with the use of only one mixing zone of the same length with a larger diameter. This embodiment is particularly suitable for larger nozzle plates. With this arrangement of course only one homogenisation of the spinning fluid is possible within each individual static mixing apparatus. However if the conduit to the mixing section is substantially free of disruption and if the individual static mixing devices are arranged in a regular manner to the inlet opening, it is to be expected that the individual parallel branches of the flow of the spinning fluid will be sufficiently homogeneous in relation to one another after passing through the respective static mixing apparatus.

The spinning device according to the invention is shown in two embodiments purely schematically in the accompanying drawings and further described below.

Figure 1:
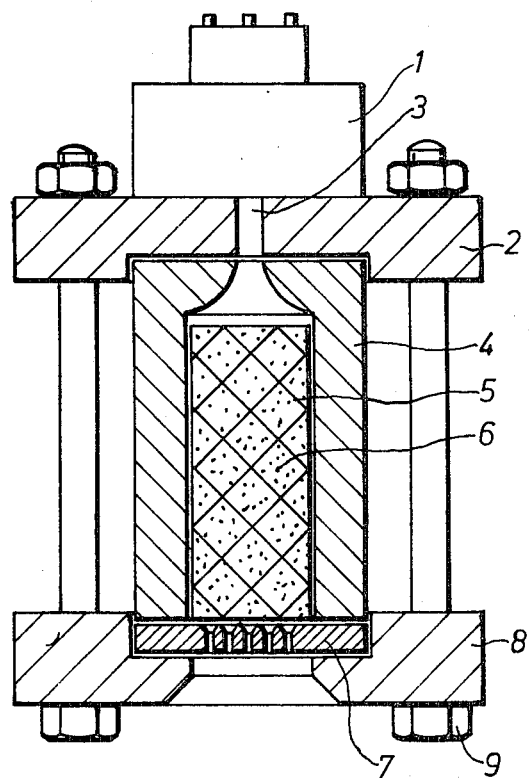
FIG. 1 shows a first embodiment of a spinning device with a static mixing apparatus, in the free spaces of which packing material is arranged.

As shown in FIG. 1, the spinning device comprises a spinning pump 1, from which a conduit 3 leads into a housing 4 through an upper frame plate 2. A static mixing apparatus 5 is arranged within it, whose free spaces are filled with packing material 6. Below the housing 4 there is located a nozzle plate 7, which is held by a lower frame plate 8. Clamping bolts 9 serve to connect the upper frame plate 2 with the lower frame plate 8.

Figure 2:
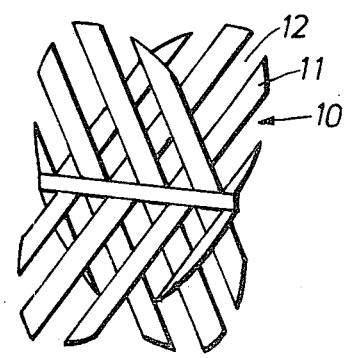
FIG. 2 shows a single pair of intersecting plates, as are provided in the static mixing apparatus according to FIG. 1.

The static mixing apparatus 5 consists of individual inserts 10 according to FIG. 2. Each insert is constructed from a connecting element, from which in two planes cross-pieces 11 extend in all four directions, and between them slots 12 are arranged. A plurality of such inserts are interconnected so that in each case cross-pieces and slots interpenetrate.

Figure 3:
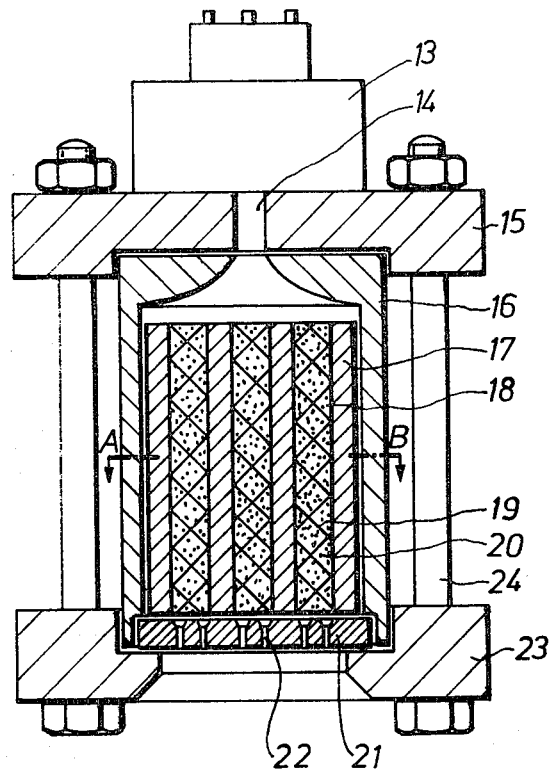
FIG. 3 shows a second embodiment of a spinning device with a plurality of parallel static mixing devices arranged over the nozzle plate.
Figure 4:
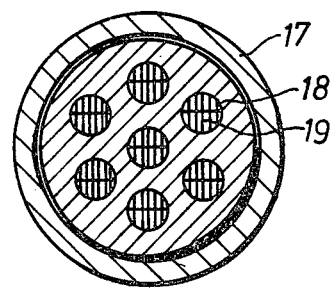
FIG. 4 shows a section along the line A–B in FIG. 3.

In FIG. 3 the spinning device consists of a spinning pump 13, from which a conduit 14 leads to a housing 16 through an upper frame plate 15. An insert 17 is arranged therein, provided with a plurality of bores 18, in which static mixing devices 19 are arranged, whose free interstitial spaces are filled with packing material 20. Below the insert 17, a nozzle plate 21 is arranged, whose nozzles 22 each lie under the bores 18 for the static mixing devices 19. The nozzle plate 21 is held by a lower frame plate 23, which is clamped to the upper frame plate 15 by means of bolts 24.

EXAMPLE

The spinning device according to FIG. 1 is used. The length of the mixing section is 60 mm; the internal housing diameter 15 mm. The static mixing device consists of pairs of plates with cross pieces and slots each 1.7 mm in width.

A spinning fluid having a viscosity of approximately 1000 Poise and a density of approximately 1 g per $cm^3$ is to be homogenised as well as possible in respect of residence time and temperature. If the above described device is used without packing material, then in a sample having a volume of 2 $mm^3$, a standard deviation of 7% is obtained. However if the static mixing device is filled with a packing material consisting of sand having an average grain size of 400 to 500 $\mu m$, then surprisingly for a sample having a volume of 2 $mm^3$, a standard deviation of approximately 0.5% can be achieved. With this arrangement, for a throughput of 0.3 kg per hour a pressure drop of approximately 165 bars occurs.

If a packing material layer 60 mm in height is used without a static mixing device, then a standard deviation of only between 20 and 40% is obtained.

EXAMPLE 2

For geometrical reson, Example 2, 1 = 590 mm, is not designed for spinning devices.

We claim:

1. The process of spinning a spinning fluid which comprises pumping the fluid through a conduit opening into a housing having a static mixing apparatus arranged therein comprising a plurality of mixing inserts in the housing each consisting of a plurality of intersecting plates disposed cross-wise and inclined with respect to the longitudinal axis of the housing, each of said plates having a plurality of alternating webs and slots for mixing of the spinning fluid during passage thereof through the housing, the free spaces between the plates and portions of the mixing inserts surrounded by the housing being filled with packing material and a nozzle plate being arranged at the downstream end of the housing.

2. The process of claim 1, wherein a housing insert having a plurality of parallel bores extending from said conduit to the nozzle plate, is disposed in the housing, each bore having a static mixing apparatus arranged therein with free spaces of the static mixing apparatus being filled with packing material.

3. A spinning device, comprising a spinning pump with a conduit opening into a housing having a static mixing apparatus arranged therein for mixing of the spinning fluid during passage thereof through the housing comprising a plurality of mixing inserts in the housing each consisting of a plurality of intersecting plates disposed cross-wise and inclined with respect to the longitudinal axis of the housing, each of said plates having a plurality of alternating webs and slots, packed material filling in the free spaces between the plates and portions of the mixing inserts surrounded by the housing and a nozzle plate being arranged at the downstream end of the housing.

4. An apparatus as claimed in claim 1, wherein a housing insert having a plurality of parallel bores extending from said conduit to the nozzle plate, is disposed in the housing, each bore having a static mixing apparatus being filled with packing material.

* * * * *

UNITED STATES PATENT AND TRADEMARK OFFICE
CERTIFICATE OF CORRECTION

PATENT NO. : 4,134,954
DATED : January 16, 1979
INVENTOR(S) : DIETER BRAUNER et al It is certified that error appears in the above—identified patent and that said Letters Patent are hereby corrected as shown below:

Col. 4, line 33, "packed" should be --packing--.

Col. 4, line 38, "1" should be --3--.

Signed and Sealed this

Twenty-first Day of August 1979

[SEAL]

Attest:

LUTRELLE F. PARKER

Attesting Officer     Acting Commissioner of Patents and Trademarks